US008381117B2

(12) United States Patent
Ueno et al.

(10) Patent No.: US 8,381,117 B2
(45) Date of Patent: Feb. 19, 2013

(54) ON A GRAPHICAL USER INTERFACE PROVIDING GUIDANCE OF OPERATIONS IN AN INDUSTRIAL PLANT

(75) Inventors: Yohei Ueno, Tokyo (JP); Tadashi Oi, Tokyo (JP); Motohiko Kawagishi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 309 days.

(21) Appl. No.: 12/933,307

(22) PCT Filed: Apr. 9, 2009

(86) PCT No.: PCT/JP2009/057283
§ 371 (c)(1),
(2), (4) Date: Oct. 26, 2010

(87) PCT Pub. No.: WO2009/125817
PCT Pub. Date: Oct. 15, 2009

(65) Prior Publication Data
US 2011/0035693 A1 Feb. 10, 2011

(30) Foreign Application Priority Data
Apr. 9, 2008 (JP) ................................. 2008-101023

(51) Int. Cl.
*G06F 3/048* (2006.01)
(52) U.S. Cl. ...................................................... 715/771
(58) Field of Classification Search .................. 715/771, 715/810
See application file for complete search history.

(56) References Cited

U.S. PATENT DOCUMENTS

| 4,042,813 | A | * | 8/1977 | Johnson | 703/18 |
| 4,064,392 | A | * | 12/1977 | Desalu | 703/18 |
| 4,941,113 | A | * | 7/1990 | Dundics et al. | 702/83 |
| 4,977,529 | A | * | 12/1990 | Gregg et al. | 703/18 |
| 5,121,318 | A | * | 6/1992 | Lipner et al. | 700/17 |
| 5,227,121 | A | * | 7/1993 | Scarola et al. | 376/216 |

(Continued)

FOREIGN PATENT DOCUMENTS

| JP | 1 199212 | 8/1989 |
| JP | 6 202707 | 7/1994 |

(Continued)

OTHER PUBLICATIONS

U.S. Appl. No. 13/160,938, filed Jun. 15, 2011, Ueno, et al.

*Primary Examiner* — Tuyetlien Tran
*Assistant Examiner* — Jessica Chuang
(74) *Attorney, Agent, or Firm* — Oblon, Spivak, McClelland, Maier & Neustadt, L.L.P.

(57) ABSTRACT

In a large-scale plant such as a power plant, a graphical user interface device displays a target data display screen without increasing a load of searching a screen or a load of grasping a screen transition link. An operation model-creating device reads operation manual data for operation estimation and operation history data from an operation manual managing device and an operation history managing device to create a number of pieces of manual procedure template data for each accident type. An operation predicting device selects the operation procedure template data having same conditions of immediately preceding operation history data obtained from the plant monitoring and control device to predict the next operation estimated to be performed by an operator from the selected operation procedure template data. The plant monitoring and control device displays a system recommended operation button on a monitoring screen thereof based on data of the predicted results.

6 Claims, 9 Drawing Sheets

U.S. PATENT DOCUMENTS

| | | | | | |
|---|---|---|---|---|---|
| 5,227,122 | A | * | 7/1993 | Scarola et al. | 376/259 |
| 5,265,131 | A | * | 11/1993 | Scarola et al. | 376/259 |
| 5,267,278 | A | * | 11/1993 | Scarola et al. | 376/259 |
| 5,271,045 | A | * | 12/1993 | Scarola et al. | 376/216 |
| 5,287,390 | A | * | 2/1994 | Scarola et al. | 376/216 |
| 5,347,553 | A | * | 9/1994 | Scarola et al. | 376/259 |
| 5,353,315 | A | * | 10/1994 | Scarola et al. | 376/259 |
| 5,353,316 | A | * | 10/1994 | Scarola et al. | 376/259 |
| 5,355,395 | A | * | 10/1994 | Kenneth et al. | 376/216 |
| 5,375,150 | A | * | 12/1994 | Scarola et al. | 376/216 |
| 5,394,447 | A | * | 2/1995 | Scarola et al. | 376/259 |
| 5,631,825 | A | * | 5/1997 | van Weele et al. | 700/83 |
| 5,715,178 | A | * | 2/1998 | Scarola et al. | 702/116 |
| 6,026,336 | A | * | 2/2000 | Sakurai et al. | 700/86 |
| 6,334,076 | B1 | * | 12/2001 | Sakurai et al. | 700/86 |
| 6,411,858 | B1 | * | 6/2002 | Sakurai et al. | 700/18 |
| 7,085,607 | B2 | * | 8/2006 | Lipner et al. | 700/9 |
| 7,999,653 | B2 | * | 8/2011 | Kubo et al. | 340/5.2 |
| 8,024,053 | B2 | * | 9/2011 | Murakami | 700/79 |
| 2004/0093188 | A1 | * | 5/2004 | Matsuno | 702/188 |
| 2005/0240289 | A1 | * | 10/2005 | Hoyte et al. | 700/49 |
| 2006/0095150 | A1 | * | 5/2006 | Inoue | 700/95 |
| 2007/0186190 | A1 | * | 8/2007 | Nakashima | 715/841 |
| 2008/0033588 | A1 | * | 2/2008 | Kubo et al. | 700/108 |
| 2008/0082184 | A1 | * | 4/2008 | Murakami | 700/79 |
| 2008/0299525 | A1 | * | 12/2008 | Murakami | 434/219 |

FOREIGN PATENT DOCUMENTS

| | | | |
|---|---|---|---|
| JP | 06-202707 | * | 7/1994 |
| JP | 10 27089 | | 1/1998 |
| JP | 10 198418 | | 7/1998 |
| JP | 2000 287387 | | 10/2000 |
| JP | 2001 92524 | | 4/2001 |
| JP | 2002 215278 | | 7/2002 |
| JP | 2005 209024 | | 8/2005 |
| JP | 2006 39648 | | 2/2006 |
| JP | 2006-039648 | * | 2/2006 |
| JP | 2006 72408 | | 3/2006 |
| JP | 2007 207186 | | 8/2007 |

* cited by examiner

F I G . 4
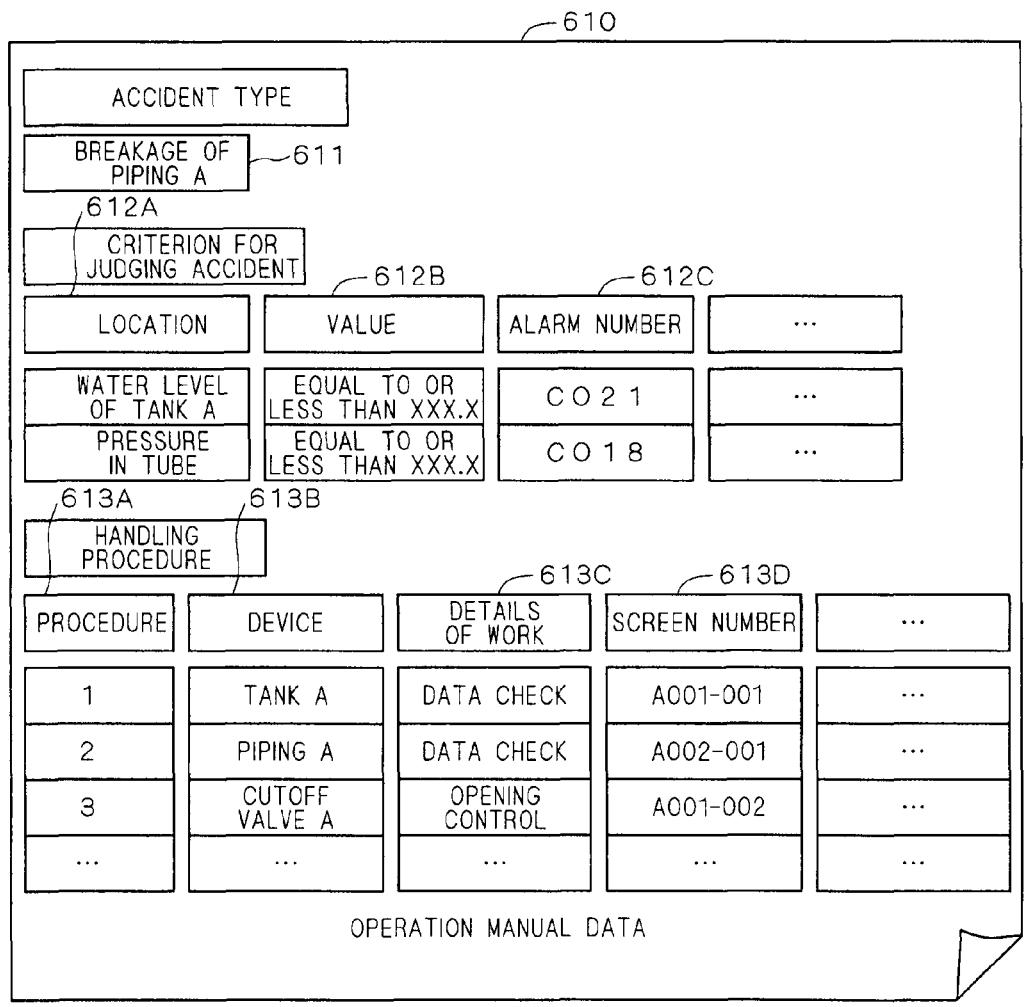

F I G . 6
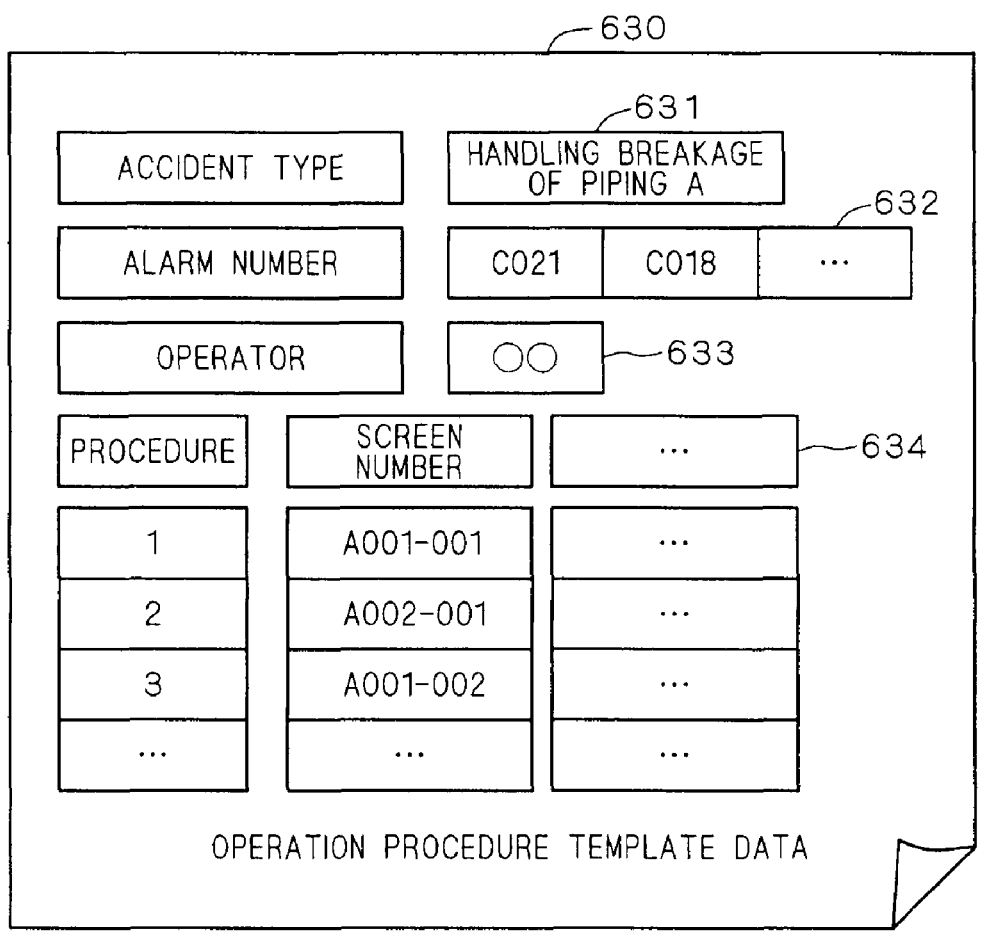

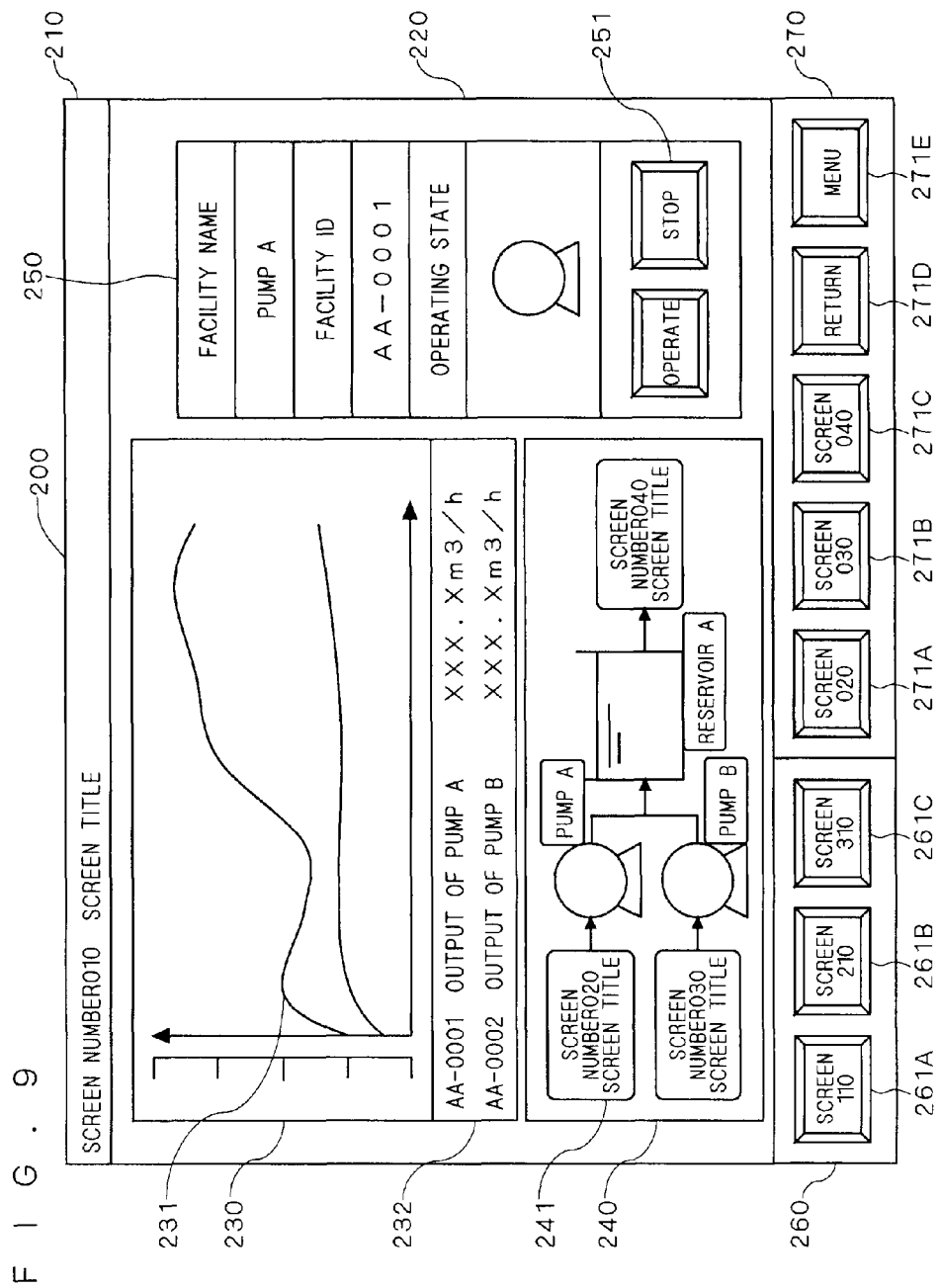

ON A GRAPHICAL USER INTERFACE PROVIDING GUIDANCE OF OPERATIONS IN AN INDUSTRIAL PLANT

TECHNICAL FIELD

The present invention relates to a graphical user interface device in a monitoring and control system for monitoring and controlling a large-scale plant such as a power plant.

BACKGROUND ART

Nowadays, demands for functions become complicated in a monitoring and control system of a power plant and, for example, the function of handling an accident as well as the function of preventing an erroneous operation are added to a conventional plant monitoring and controlling function. The monitoring and control system is provided with a graphical user interface device for alleviating an operational load on an operator that increases as the system becomes complicated as described above. The graphical user interface device has the function of notifying an operator of an operating state of a power plant in an intuitively easy-to-understand manner, using display of digital values, display of a graph, colors, display of a pattern and the like. In addition, the graphical user interface device has the function of outputting an instruction input from an input device such as a keyboard, a mouse and a touch panel to a power plant.

A plant monitoring and control system is used not only as a display tool for plant data but also as a tool for controlling a plant and determining a state. In a case where an operator uses a plant monitoring and control system, the operator cyclically performs the process of first, grasping a state of an entire plant from a display screen of macro information, then determining a major factor that affects the plant from a detailed information display screen of a device, and then controlling a target device from a control screen.

The number of monitoring and control data items tend to increase as a power plant and a plant monitoring and control system become complicated. Moreover, along with an increase in data item, the number of monitoring screens increases as well.

According to Patent Document 1 or Patent Document 2, a screen configuration of a conventional plant monitoring and control system has hierarchical reciprocal links and is configured to reach an appropriate monitoring screen by following the links between screens. For example, on a default monitoring screen, macro data is displayed for grasping a state of an entire plant, and an operator performs the system operation of transiting to a detailed information display screen of a device by selecting an appropriate facility on the screen.

PRIOR ART DOCUMENT

Patent Documents

Patent Document 1: Japanese Patent Application Laid-Open No. 10-198418
Patent Document 2: Japanese Patent Application Laid-Open No. 2000-287387

DISCLOSURE OF INVENTION

Problem to be Solved by the Invention

When an operator judges a state of a plant, the operator needs to grasp data of multiple facilities. However, in a conventional monitoring and control system, the operator needs to repeatedly perform the operation of transiting from an initial screen to a detailed data display screen of a certain facility to check target data, returning to the initial screen again and then transiting to a detailed data display screen of another facility to check data. This results in an increased number of screen operations, leading to a problem that it takes time to check all pieces of data. In particular, the above-mentioned problem is required to be alleviated in handling an accident that needs urgent work.

The present invention has been made in view of the above-mentioned technical circumstances, and an object thereof is to provide, in a large-scale plant such as a power plant, a graphical user interface device that achieves the operation of displaying a target data display screen without increasing a load of searching a screen as well as a load of grasping a screen transition link.

Means to Solve the Problem

The subject of the present invention relates to a graphical user interface device in a monitoring and control system that monitors and controls a plant, which includes: a memory device in which pieces of operation manual data including descriptions regarding an operation target and operation details are registered, the pieces of operation manual data being arranged in an order of operation procedure; a database in which device IDs indicating devices being the operation targets and operation IDs indicating the operation details are registered; and an operation model creating device automatically creating, from the operation manual data, operation procedure template data including information of one or multiple operation procedures and device IDs and operation IDs corresponding to respective procedures of the operation procedure for each type of a handling operation to register the operation procedure template data in the memory device, wherein the graphical user interface device is configured to select, by a pattern matching processing of the operation procedure template data and plant measurement data including device IDs and operation IDs respectively corresponding to multiple immediately-preceding successive operations, operation procedure template data having a high degree of coincidence with the immediately preceding operation, and estimate a type of a handling operation currently executed by an operator and subsequent operation details, to thereby display, on a display section of the monitoring and control system, guidance information based on a device ID and an operation ID corresponding to the estimated subsequent operation details.

Effects of the Invention

According to the subject of the present invention, the guidance information provided by the system includes the device ID and the operation ID of the subsequent operation, and thus it is possible to avoid the operation of returning once to an initial screen for checking other data. As a result, the effect that the time required for the operator to check a target data item can be reduced is attained.

Referring now to the attached drawings, the embodiments of the subject of the present invention will be described in detail in conjunction with effects and advantages thereof.

BRIEF DESCRIPTION OF DRAWINGS

FIG. 4 is a diagram showing an example of operation manual data of the plant monitoring and control system, which is a target of the present invention.

FIG. 6 is a diagram showing an example of operation procedure template data of the plant monitoring and control system, which is a target of the present invention.

FIG. 9 is a diagram showing an example of a graphical user interface screen according to a third embodiment of the present invention.

BEST MODES FOR CARRYING OUT THE INVENTION

First Embodiment

Figure 1:
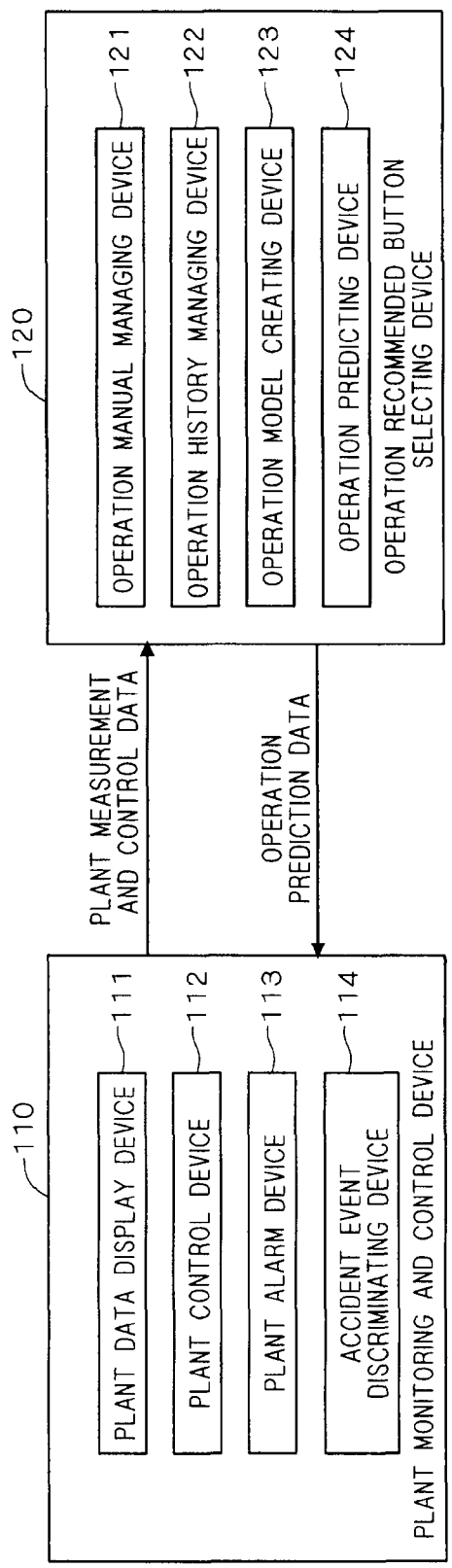
FIG. 1 is a block diagram showing a configuration of a plant monitoring and control system according to a first embodiment of the present invention.

FIG. 1 is a block diagram showing the configuration of a plant monitoring control device according to the present embodiment. The plant monitoring and control device has the configuration in which an operation recommended button selecting device 120 is added to a conventional plant monitoring and control device 110.

The plant monitoring and control device 110 includes, as components thereof, (1) a plant data display device 111 that visualizes plant information by a graphical user interface and transmits it to an operator, (2) a plant control device 112 that controls a plant by the graphical user interface, (3) a plant alarm device 113 that compares a value of data measured in the plant with a reference value set in advance in a system to discriminate between normality and abnormality of the measured data value, (4) an accident event discriminating device 114 that discriminates a degree of importance of an alarm in a case where multiple pieces of abnormal data have been found by the plant alarm device 113, (5) a memory device (for example, which includes a hard disk (not shown)) that stores, for example, operation manual data and operation history data described below, and (6) a timer (not shown).

The operation recommended button selecting device 120 is the device that predicts the next operation performed by the operator from, for example, the operation details of the operator in the plant monitoring and control device. The components thereof are as follows. That is, an operation manual managing device 121 and an operation history managing device 122 are devices that manage data used in predicting the next operation performed by the operator. An operation model creating device 123 is the device that creates operation procedure template data described below from the operation history data of the operator and the like. An operation predicting device 124 is the device that analyzes the operation of the plant currently performed by the operator in the plant monitoring and control device and the operation procedure template data created by the operation model creating device 123 to predict the next operation performed by the operator.

Further, the operation recommended button selecting device 120 includes a dedicated timer (not shown) synchronized with the above-mentioned timer of the plant monitoring and control device so as to tick the same time as the above-mentioned timer.

The operation recommended button selecting device 120 retrieves, as input data, various types of data input to the plant monitoring and control device 110, that is, plant measurement data including operation manual data, operation history data, alarm data, operation data (operation information) indicating an operation of a plant that is currently performed by the operator and the control data and, on the other hand, outputs operation prediction data providing prediction of an operation that will be performed by the operator next to the plant monitoring and control device 110. Upon input of the operation prediction data, the plant monitoring and control device 110 displays to the operator, in the plant data display device 111, a screen (guidance information) of an operation button (referred to as system recommended operation button) for transiting to the screen on which a control button for linking the current screen to the operation screen predicted to be performed by the operator next.

Figure 2:
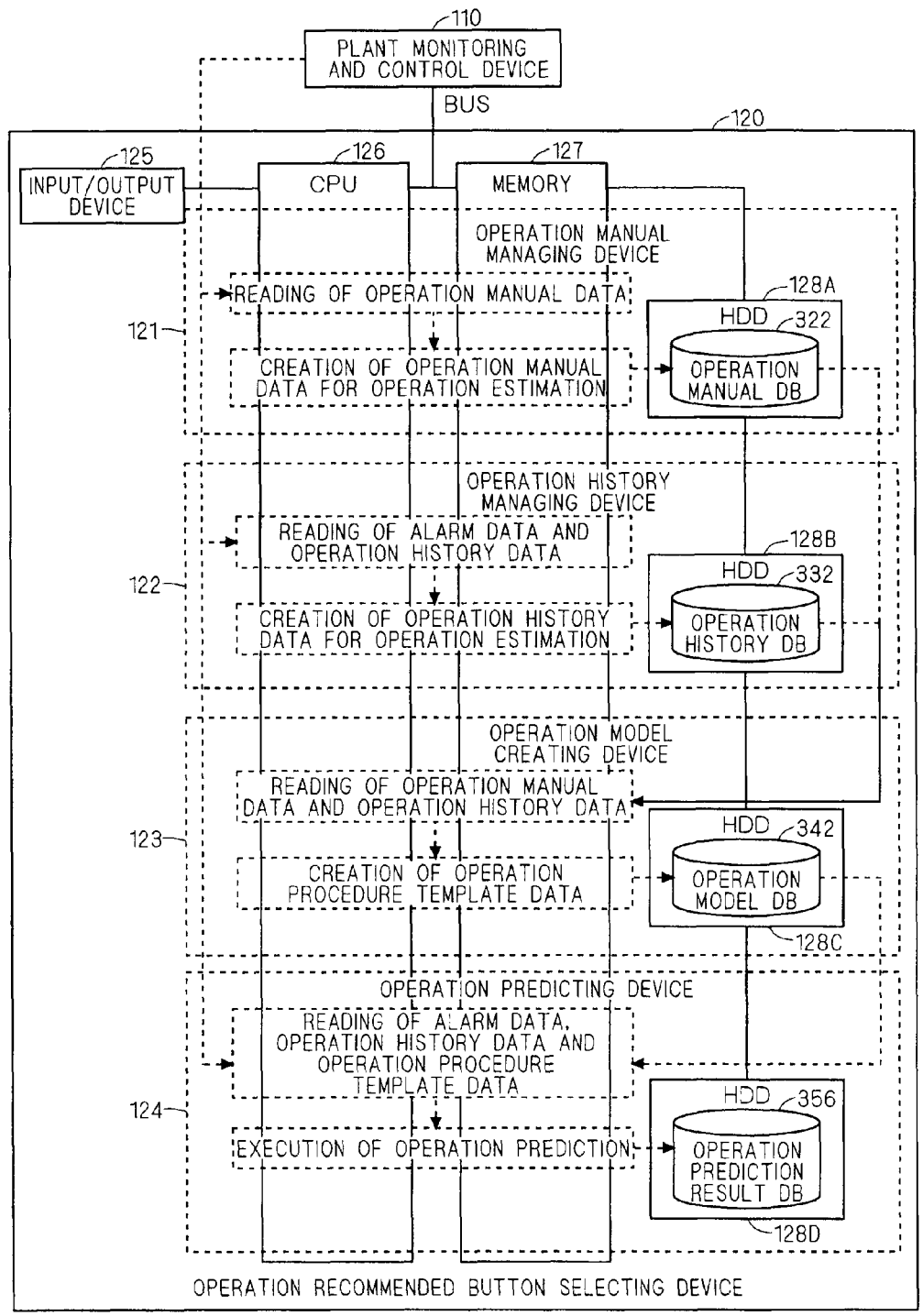
FIG. 2 is a hardware configuration diagram of an operation recommended button selecting device, which is a target of the present invention.

Here, FIG. 2 is a block diagram showing the configuration of hardware of the operation recommended button selecting device 120 of FIG. 1 and an internal operation thereof, which also shows the correspondence between pieces of hardware and the components 121 to 124 of FIG. 1. In FIG. 2, the operation recommended button selecting device 120 includes an input/output device 125, a CPU 126, a memory 127 and HDDs 128A to 128D as components thereof, and those components 125 to 127 and 128A to 128D are connected by a bus BUS. Moreover, the bus BUS is connected also to the plant monitoring and control device 110.

The input/output device 125 of FIG. 2 displays data to the operator as well as receives data input by the operator. The CPU 126 and the memory 127 that are core parts of the operation recommended button selecting device 120 control data transmission/reception among the plant monitoring and control device 110, the input/output device 125 and respective HDDs 128A to 128D and perform arithmetic processing. Provided respectively in the HDDs 128A to 128D are an operation manual DB 322, an operation history DB 332, an operation model DB 342 and a search prediction result DB 356. In addition, the HDDs 128A to 128D have the function of storing the results of the arithmetic processing that are obtained by the CPU 126 and the memory 127 in the corresponding databases (DBs) 322, 332, 342 and 356, respectively.

Figure 3:
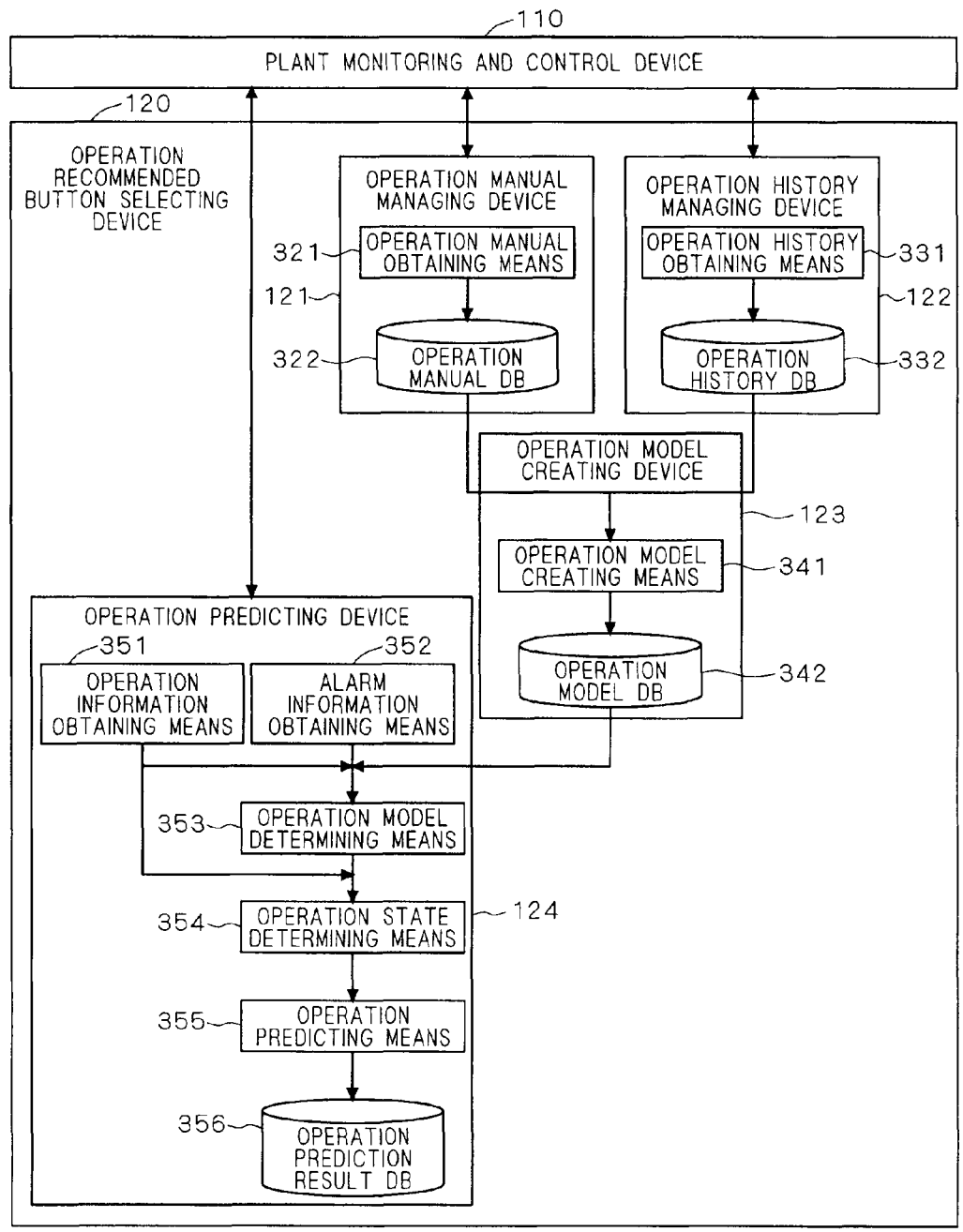
FIG. 3 is a flowchart showing an internal operation of the operation recommended button selecting device according to the first embodiment of the present invention.

FIG. 3 is a flowchart showing an internal operation of the operation recommended button selecting device 120, which is drawn correspondingly to FIG. 2. As shown in FIG. 3, correspondingly to FIG. 1 and FIG. 2, the operation recommended button selecting device 120 is composed of the operation manual managing device 121, the operation history managing device 122, the operation model creating device 123 and the operation predicting device 124.

The operation manual managing device 121 of FIG. 3 is the device that obtains and processes the operation manual data when an accident occurs that is stored in the hard disk of the plant monitoring and control device 110 by operation manual obtaining means 321 and stores the created operation manual data for operation estimation after being processed in the operation manual DB 322.

Here, FIG. 4 shows an example 610 of the operation manual data stored in the hard disk of the plant monitoring and control device 110. As shown in FIG. 4, operation manual data 610 is composed of accident type data 611, accident determining reference data 612A to 612C, handling procedure data 613A to 613D and the like. As shown in FIG. 4, in the handling procedure data 613A to 613D of the operation manual data 610, for each operation procedure (613A), pieces of data such as an identifier (device ID) (613B) indicating a target device of the operation, an identifier (operation ID) (613C) indicating the operation details (operation details) and an identifier (screen number) (613D) indicating an operation screen on which the operation is performed are described by being associated with each other, and descriptions thereof are arranged in an order of operation procedure.

The fact that the results of the locations (for example, water level of a tank A) that are measured by the plant apply to the conditions of the accident determining reference data 612A to 612C of the operation manual data 610 indicates that the accident event discriminating device 114 of the plant monitoring and control device 110 determines the generation of the accident type data 611 (for example, breakage of piping A) to execute the handling procedures 613A to 613D in an arrangement order thereof. The operation manual data 610 is assumed to be created as a standard format, and to be described in such a manner that the operation manual managing device 121 or the operation manual obtaining means 321 of the system is capable of retrieving the details of the operation manual data 610.

The operation history managing device 122 of FIG. 3 is the device that obtains the operation history data including the data indicating the operation procedure performed in the plant monitoring and control device 110, the alarm data generated in the plant alarm data generated in the plant alarm device 113, and the event discriminating data generated in the accident event discriminating device 114 by operation history obtaining means 331 and processes the operation history data, to thereby store the operation history data after being processed in the operation history DB 332 as the operation history data for operation estimation.

Figure 5:
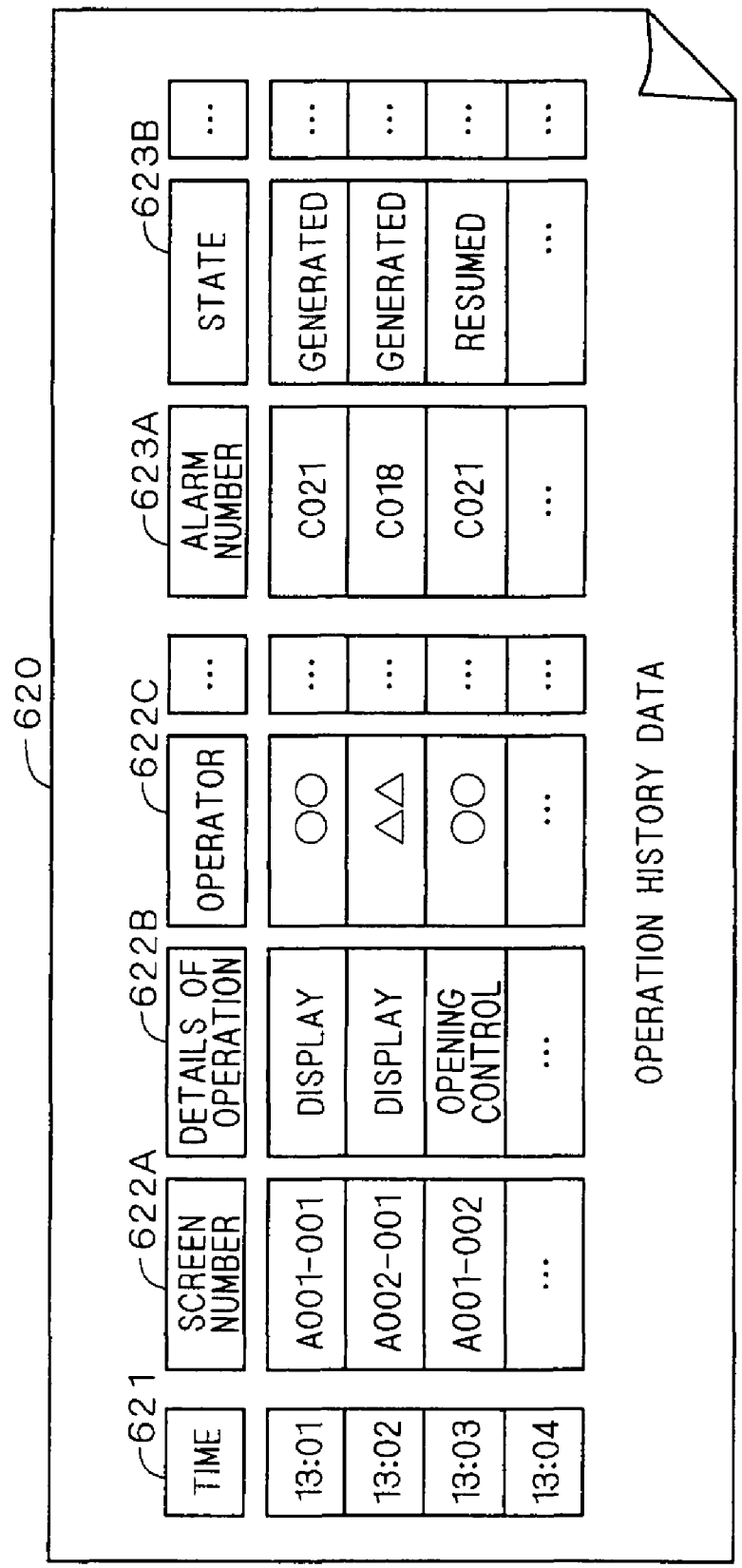
FIG. 5 is a diagram showing an example of operation history data of the plant monitoring and control system, which is a target of the present invention.

Here, FIG. 5 shows an example 620 of the operation history data stored in the hard disk of the plant monitoring and control device 110. As shown in FIG. 5, the operation history data 620 is composed of time data 621 corresponding to an order of operation procedure, operation details data 622A to 622C, alarm data 623A and 623B and the like. FIG. 5 indicates that the operator 622C performed the operation of the operation details 622B on a screen of the screen number 622A in a time-series order shown by the time data 621. In addition, FIG. 5 indicates that the alarm number 623A established the state 623B of generation or restoration in the time-series order shown by the time data 621. The operation history data 620 is assumed to be the data created in the standard format, and to be described in such a manner that the operation history managing device 122 or the operation history obtaining means 331 of the system is capable of retrieving the details of the operation history data 620. When attention is paid to the operation details 622B of the operation history data 620, there are two types of "displayed" screens, that is, (A) a screen on which display is made for the purpose of monitoring and controlling data and (B) a screen on which display is made as a passing point to transit to a target screen.

For example, in a case where control is made on the display screen or a case where the display time exceeds a threshold value, the operation history obtaining means 331 of FIG. 3 determines as the "display for the purpose of monitoring and controlling data" and stores a portion of the operation history data corresponding to the operation details in the operation history DB 332. To the contrary, in a case where control is not made and the display time does not exceed the threshold value, the operation history obtaining means 331 determines as the "display as the passing point" and does not store the portion of the operation history data corresponding to the operation details in the operation history DB 332. In this manner, the operation history data 620 obtained from the plant monitoring and control device 110 is processed and then stored in the operation history DB 332.

Operation model creating means 341 (FIG. 3) of the operation model creating device 123 creates operation procedure template data from the data stored in the operation manual DB 322 and the operation history DB 332.

Here, FIG. 6 shows an example 630 of the operation procedure template data created by the operation model creating means 341. As shown in FIG. 6, the operation procedure template data 630 is composed of accident type data 631, alarm number data 632, operator data 633, handling procedure data 634 including a screen number, and the like. In the handling procedure data 634, as in the handling procedure data 613A to 613D of the operation manual data 610, an identifier (device ID) of a device to be operated, an identifier (operation ID) of the operation details (details of the work) and an identifier (screen number) of a screen for performing the operation are associated with each other and described for each operation procedure, and descriptions thereof are arranged in an order of operation procedure. The operation procedure template data having the above-mentioned configuration is created for each accident type (that is, for each type of handling operation), and thus the number thereof is large, for example, several hundreds.

(i) In a case where data in the operation manual DB 322 is used, the operation model creating means 341 of FIG. 3 automatically recognizes an operation pattern from the operation manual data to create the operation procedure template data. That is, the operation model creating means 341 registers all operators in the operator data 633 of FIG. 6 and, as to other data 631, 632 and 634, uses values described in the operation manual data 610 for registration, to thereby store the thus obtained data in the operation model DB 342 as the operation procedure template data.

On the other hand, (ii) in a case where data in the operation history DB 332 is used, the operation model creating means 341 of FIG. 3 automatically searches the operation history data for an operation pattern to create the operation procedure template data based on that. That is, the operation model creating means 341 compares the alarm numbers 623A and 623B of the operation history data in the operation history DB 332 with the already-registered alarm number 632 of the operation procedure template data 630, to thereby examine an occurrence state of each accident type 631. Then, in a case where the accident occurrence state is found in the operation history data within the operation history DB 332, and the operation details of the operation details data 622A to 622C are different from the details of the handling procedure data 634 of the operation procedure template data 630, the operation model creating means 341 of FIG. 3 stores the resultant obtained by adding the operation details of the operation details data 622A to 622C following the handling procedure data 634 of the operation procedure template data 630 in the operation model DB 342 as new operation procedure template data.

In the plant monitoring and control system, even in the case of the same plant data and the same control function of the plant control device, in many cases, a control button or a control switch for controlling a plant (for example, operation of closing or opening a valve) is displayed on multiple monitoring screens by changing a combination with other data. Therefore, there occurs no problem in actual use even when the screens having the same control function are used, other than the screen designated in the operation manual data. Accordingly, even in a case where the same work is performed, there are multiple operation procedures on which preferences of operators are reflected in addition to the procedures defined in the operation manual.

In the present invention, it is possible to obtain multiple operation procedures existing for one operation purpose by not only using the operation manual data designated in advance in the system but also using the actual operation history stored in the operation history DB 332. The above-mentioned operation procedure template data is created by automatically obtaining data while performing the monitoring and control operation, which does not cause any new load relating to the creation of operation procedure template data on the operator.

The operation predicting device 124 of FIG. 3 is the device that selects a target transition screen recommended by the system. In the operation predicting device 124, operation information obtaining means 351 and alarm information obtaining means 352 obtain the operation history data (operation information) of the immediately preceding operation actually performed by the operator from the plant monitoring and control device 110, and operation model determining means 353 reads pieces of operation procedure template data stored in the operation model DB 342. Then, the operation model determining means 353 performs a pattern matching processing from the immediately preceding operation history data and the pieces of operation procedure template data, to thereby select optimum operation procedure template data having the data of the same conditions (values closest to the values of data 632, 633 and 634) from among several hundreds of operation procedure template patterns stored in the operation model DB 342. Next, operation state determining means 354 of FIG. 3 estimates an operation at which stage of the selected operation procedure template is currently being performed. That is, the operation state determining means 354 selects a screen number corresponding to the current time from the time data of the obtained immediately preceding operation history data, and estimates or determines the procedure corresponding to the selected screen number from the handling procedure data 634 of the selected operation procedure template. Operation predicting means 355 of FIG. 3 estimates the operation that will be performed next (which corresponds to the operation in which a procedure following the estimated procedure will be performed next) from the obtained estimation results and stores the estimated prediction results in an operation prediction result DB 356. Those prediction results are created by automatically obtaining data, which causes no new workload on the operator.

The CPU 126 of the operation recommended button selecting device 120 reads the prediction results from the operation prediction result DB 356 and output those to the plant monitoring and control device 110. As a result, the plant monitoring and control device 110 displays, to the operator, the screen of the above-mentioned system recommended operation button on the display screen of the plant data display device 111.

As described above, according to the present embodiment, it is possible to prevent the operator from performing the operation of returning once to an initial screen for checking other data by using an operation button that is recommended by the system and is displayed on a display screen, which enables a reduction in the time required for the operator to check a target data item (time required for screen transition).

Second Embodiment

Figure 7:
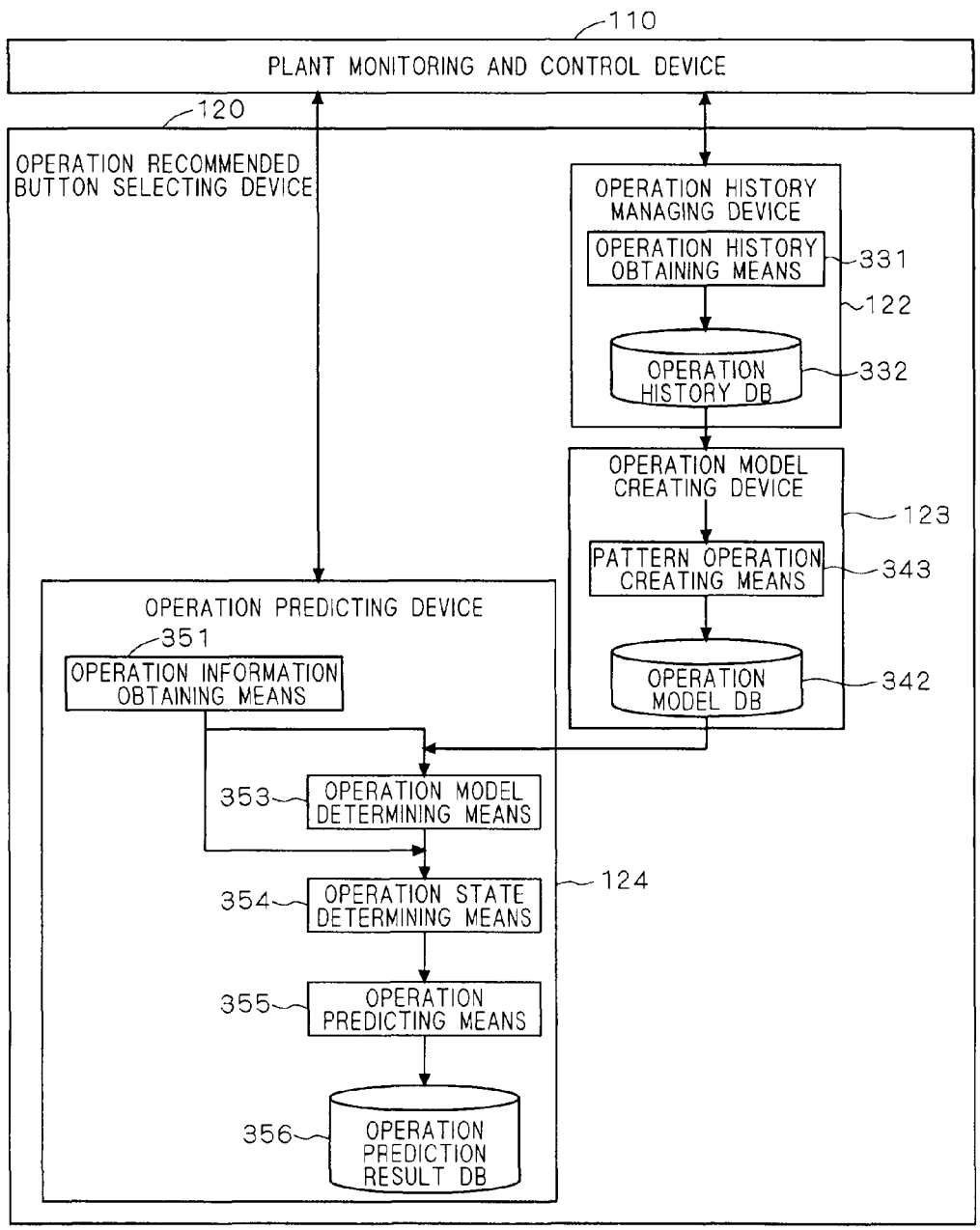
FIG. 7 is a flowchart showing an internal operation of an operation recommended button selecting device according to a second embodiment of the present invention.

FIG. 7 is a flowchart showing an internal operation of the operation recommended button selecting device 120 included in the graphical user interface device according to the present embodiment. Note that the configuration and operation of the plant monitoring and control device are similar to those of the first embodiment.

The device 120 of FIG. 7 is the device that finds, in a case where specific operation details are not defined and prepared in the operation manual, such as a normal monitoring task, the regularity of the pieces of operation history data in during normal case that are stored in the operation history DB 332 when the operation of the same procedure is repeatedly performed.

Pattern operation creating means 343 of the operation model creating device 123 periodically searches the data of the operation history DB 332 and as a consequence, in a case where, for example, multiple spots of the same pattern arrangement are found in the screen number list, registers the operation procedure as the template data. That is, the pattern operation creating means 343 repeatedly searches the operation history data including an operation ID and a device ID of that target device by a predetermined search algorithm, and specifies multiple successive operations that occur with a high frequency, to thereby automatically register the specified operation history data as the operation procedure template data.

Here, in the operation predicting device 124, at least the operation information (operation history data) of the operator that is obtained by the operation information obtaining means 351 is used as the input data, and the operation model determining means 353 performs a pattern matching processing of the operation information obtained by the operation information obtaining means 351 and pieces of operation procedure template data read from the operation model DB 342, and selects the operation procedure template (operation procedure template having the closest alarm number data, operator data and handling procedure data) having the data of the same conditions as the operation information obtained by the operation information obtaining means 351 among a number of operation procedure template patterns that are stored in the operation model DB 342 and are created for each accident type (selection of an operation list). Next, the operation state determining means 354 uses the immediately preceding operation history data that is obtained by the operation information obtaining means 351 to estimate the operation at which stage of the selected operation procedure template is currently being operated by the operator. The operation predicting means 355 predicts the operation estimated to be performed next based on the obtained estimation results, and stores its prediction results in the operation prediction result DB 356.

After that, the operation recommended button selecting device 120 outputs the predicted results to the plant monitoring and control device 110 and displays the system recommended operation button on the display screen thereof based on the prediction results received by the plant monitoring and control device 110, which is similar to the first embodiment.

According to the present embodiment, it is possible to automatically obtain the operation procedure template data even in a task in which an operation manual does not exist and, as a result, similar effects to the effects described in the first embodiment are obtained.

Third Embodiment

Figure 8:
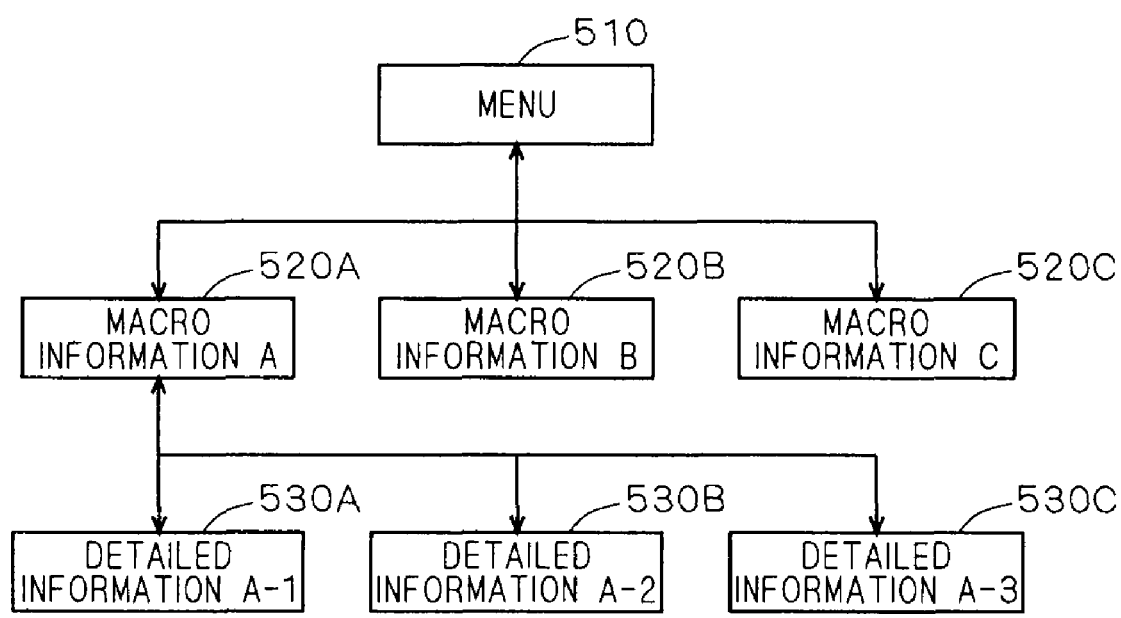
FIG. 8 is a diagram showing an example of a screen configuration of the plant monitoring and control system, which is a target of the present invention.

FIG. 8 is a diagram showing an example of the screen configuration of the plant monitoring and control system, which is a target of the present invention. Here, a menu screen 510 is set as the hierarchically top screen. Respective screens have reciprocal links in a hierarchical manner, and the screen configuration is designed so as to reach an appropriate monitoring screen by following the links between the screens. Provided in the upper part of the hierarchical structure are macro information screens 520A to 520C regarding the entire plant and, in a case where the operator checks detailed data relating to the macro information A screen 520A, it is required to transit to any of a detailed information A-1 screen 530A to a detailed information A-3 screen 530C that are linked to the macro information A screen 520A. Note that screen hierarchy may be classified in the units of facilities, units of functions or the like. Any number of screens are set to have the depth of the hierarchical structure and to belong to the same hierarchy. Further, there may be provided a link capable of transiting directly to an appropriate screen beyond the screen hierarchies.

FIG. 9 is a diagram schematically showing an example of a graphical user interface screen according to the first or second embodiment of the present invention. A graphical user interface screen 200 is composed of a screen title display section 210, a plant information display section 220, a system recommended operation button display section 260 and a system setting operation button display section 270.

The plant information display section 220 has an object to provide the operator with the information required for performing a monitoring and control task of a plant in an easily understood manner, and is formed of the combination of a data display section 230, a system diagram display section 240 and an operating device display section 250. For example, the plant information display section 220 may be composed only of the data display section 230, or may be composed only of the data display section 230 and the operating device display section 250. Alternatively, the plant information display section 220 may be configured such that multiple data display sections 230 are provided in the plant information display section 220. The data display section 230 is the part that has the function of displaying plant measurements such as a trend chart 231 and measurements 232. While FIG. 9 shows an example of the trend graph 231, it may be replaced with various types of graphs such as a bar graph and a pie graph. The display of the measurement 232 may be replaced with the display using a symbol such as a color or flashing or the display by an indicator such as a meter, in place of the display of digital values. The system diagram display section 240 is the part that displays a plant system chart. In the display of the plant system chart, there may be used, for example, label display of icons, connecting lines, facility names and IDs. Alternatively, digital value display and graph display may be used in combination on the system chart display section 240. The operating device display section 250 is the part that displays information regarding a device operating software switch 251, a device name, a device ID, and a device operation such as an operating state. In the example of FIG. 9, while a push button is displayed as the software switch 251, a rotary controller, a slide controller or the like may be used in place of this.

The system setting operation button display section 270 displays screen transition buttons 271A to 271E that are designated for each screen. When the screen transition buttons 271A to 271E are pushed, the screen 200 transits to the screens predetermined correspondingly to the screen transition buttons, or to the screens operated by the operator last time. As to the screen transition buttons 271A to 271E, transition destinations thereof and labels displayed thereon both remain unchanged unless the system setting is changed. The screen transition buttons 271A to 271E operate in a similar manner to screen transition buttons in a conventional monitoring and control system and, if the system setting button display section 270 is provided in the screen 200, the system becomes operational in a conventional manner. In this case, appropriate number of screen transition buttons are set as the screen transition destinations. Further, while the screen transition buttons 271A to 271E are taken as an example of the software switch in this case, pull-down menu or tree structure display on an entire screen may be used in place of those.

The system recommended button display section 260 displays, using the operation prediction data stored in the operation prediction result DB 356 of the operation recommended button selecting device 120, screen transition buttons 261A to 261C for calling the next screen that is predicted to be operated by the operator. Even in the case of displaying the same screen, estimation results of the operation change if the operation details vary, which makes the operation prediction result different. Unlike the system setting button display section 270, the optimum screen transition buttons 261A to 261C are assigned to the system recommended button display section 260, correspondingly to the operations performed by the operator. Note that appropriate number of buttons are provided as the screen transition destinations.

As described above, two types of button display sections formed of the system recommended operation button display section 260 and the system setting operation button display section 270 are provided in the screen 200. Accordingly, in a case where an operation on a manual base such as handling of an accident is required, it is possible to alleviate the execution of an unnecessary screen transition operation in a conventional system, with the use of the system recommended operation button display section 260. On the other hand, in a case of performing an operation in which a manual of a normal monitoring and control task or the like is not defined, the operator is capable of performing a screen-hierarchy-conscious monitoring task such as the extension from the macro data display screen to the detailed data display screen, with the use of the system setting operation button display section 270. Alternatively, in a case where the operator repeatedly performs the same operation procedure by using the system setting operation button display section 270, which is not defined in the manual, the data is accumulated in the operation history DB 332 and is registered as the work procedure template data in the operation model DB 342. After the use for a certain time period, the operation prediction results are reflected on the system recommended operation button display section 260, and thus in a case where the operator performs a similar operation again, the operator is capable of achieving simplification of the operation with the use of the system recommended operation button display section 260 on which the operation prediction results are reflected.

As described above, according to the present embodiment, the use of the system recommended operation button display section 260 enables a reduction in the time required for screen transition in a case where the operation on a manual base such as handling of an accident is required, whereas the use of the system setting operation button display section 270 enables a screen-hierarchy-conscious monitoring task in a case where an operation in which a manual of a normal monitoring task or the like is not defined is performed.

Notes

While the embodiments of the present invention have been shown and described in detail, the foregoing description is in all aspects illustrative, and the present invention is not limited thereto. That is, numerous modifications and variations can be devised in the described aspects without departing from the scope of the invention.

DESCRIPTION OF SYMBOLS

110; plant monitoring control device, 111; plant data display device, 112; plant control device, 113; plant alarm device, 114; accident event discriminating device, 120; operation recommended button selecting device, 121; operation manual managing device, 122; operation history managing device, 123; operation model creating device, 124; operation predicting device, 125; input/output device, 126; CPU, 127; memory, 128A to 128D; HDD, 200; graphical user interface screen, 210; screen title display section, 220; plant information display section, 230; data display section, 231; trend graph, 232; measurement, 240; system chart display section, 241; system chart icon, 250; operating device display section, 251; device operating software switch, 260; system recommended operation button display section, 261A to 261C; screen transition button, 270; system setting operation button display section, 271A to 271E; screen transition button, 321; operation manual obtaining means, 322; operation manual DB, 331; operation history obtaining means, 332; operation history DB, 341; operation model creating means, 342; operation model DB, 351; operation history data obtaining means, 352; alarm data obtaining means, 353; operation model determining means, 354; operation state determining means, 355; operation predicting means, 356; operation prediction result DB, 510; menu screen, 520A; macro information A screen, 520B; macro information B screen, 520C; macro information C screen, 530A; detailed information A-1 screen, 530B; detailed information A-2 screen, 530C; detailed information A-3 screen, 610; example of operation manual data, 611; accident type data, 612A to 612C; accident determining reference data, 613A to 613D; handling procedure data, 620; example of operation history data, 621; time data, 622A to 622C; operation details data, 623A and 623B; alarm data, 630; example of operation procedure template data, 631; accident type data, 632; alarm number data, 633; operator data, 634; handling procedure data

The invention claimed is:

1. A graphical user interface device in a monitoring and control system that monitors and controls an industrial plant, the graphical user interface device comprising:
a memory device in which pieces of operation manual data including descriptions regarding operation targets and operation details are registered, the descriptions being arranged in an order of operation procedure;
a database in which device identifications (ID) indicating devices being said operation targets and operation IDs indicating said operation details are registered; and
an operation model creating device automatically creating, from said operation manual data, operation procedure template data including information of one or multiple operation procedures and device IDs and operation IDs corresponding to respective procedures of the operation procedure for each type of a handling operation to register the operation procedure template data in the memory device,
wherein the graphical user interface device is configured to select, by a pattern matching processing of said operation procedure template data and plant measurement data including device IDs and operation IDs respectively corresponding to multiple immediately-preceding successive operations, operation procedure template data having a high degree of coincidence with said immediately preceding operation, and estimate a type of a handling operation currently executed by an operator and subsequent operation details, to thereby display, on a display section of said monitoring and control system, guidance information based on a device ID and an operation ID corresponding to the estimated subsequent operation details.

2. The graphical user interface device according to claim 1, wherein said operation model creating device is configured to perform a pattern matching processing of said operation procedure template data and operation history data including device IDs and operation IDs, and create, in a case where a procedure of the operation or a device differs between the existing operation procedure template data and said operation history data, new operation procedure template data corresponding to said operation history data to automatically add and register the new operation procedure template data to the memory device.

3. The graphical user interface device according to claim 1, wherein said operation model creating device is configured to identify multiple successive operations appearing with a high frequency from operation history data including device IDs and operation IDs, and automatically add and register the multiple successive operations as operation procedure template data to the memory device.

4. The graphical user interface device according to claim 1, wherein said plant monitoring and control device includes, on a plant monitoring screen:
a system setting operation button display section making no change in a screen transition link unless system setting is changed; and
a system recommended operation button display section using an operation ID and a device ID corresponding to a subsequent operation of said immediately preceding operation in the operation procedure template data having a high degree of coincidence with said immediately preceding operation to change the screen transition link in real time.

5. The graphical user interface device according to claim 2, wherein said plant monitoring and control device includes, on a plant monitoring screen:
a system setting operation button display section making no change in a screen transition link unless system setting is changed; and
a system recommended operation button display section using an operation ID and a device ID corresponding to a subsequent operation of said immediately preceding operation in the operation procedure template data having a high degree of coincidence with said immediately preceding operation to change the screen transition link in real time.

6. The graphical user interface device according to claim 3, wherein said plant monitoring and control device includes, on a plant monitoring screen:
a system setting operation button display section making no change in a screen transition link unless system setting is changed; and
a system recommended operation button display section using an operation ID and a device ID corresponding to a subsequent operation of said immediately preceding operation in the operation procedure template data having a high degree of coincidence with said immediately preceding operation to change the screen transition link in real time.

* * * * *